UNITED STATES PATENT OFFICE.

EDWARD WRAY, OF FAIRFIELD, NEAR MANCHESTER, ENGLAND, ASSIGNOR TO CLAUS & CO., LIMITED, OF CLAYTON, MANCHESTER, ENGLAND.

MANUFACTURE OF NEW INDOPHENOLIC COMPOUNDS AND OF DYESTUFFS THEREFROM.

1,247,475.   Specification of Letters Patent.   Patented Nov. 20, 1917.

No Drawing.   Application filed August 12, 1916. Serial No. 114,631.

*To all whom it may concern:*

Be it known that I, EDWARD WRAY, a subject of the King of Great Britain, residing at 65 Manchester road, Fairfield, near Manchester, England, have invented a new and useful Manufacture of New Indophenolic Compounds and of Dyestuffs Therefrom, of which the following is a specification.

I have found that carbazyl-N-acetic acid, or esters thereof, which can be obtained by condensing carbazole, or an alkaline salt thereof, with chlor-acetic acid, or an ester thereof can be converted into indophenols by condensation (in sulfuric acid) with para-nitroso-phenol, or a homologue, or derivative thereof, and that if these indophenols, or their leuco-compounds, be treated with sulfurizing agents, valuable dyestuffs are produced, which can be used for dyeing in the presence of alkaline sulfids, or as vat dyes, the dyeings being very fast against washing, light and bleaching.

The following are examples of how this invention may be performed, but I do not limit myself to these examples. The parts are by weight.

Example of the production of an indophenolic compound.

41 parts of para-nitroso-phenol are dissolved in about 410 parts of concentrated sulfuric acid to which external cooling is applied. To this solution 75 parts of carbazyl-N-acetic acid dissolved in about 750 parts of cold concentrated sulfuric acid, are added, while stirring and cooling well. When the reaction is complete the whole is poured onto ice and the separated product of condensation is filtered off and washed with water until it is free from mineral acid.

In the dry state the indophenol is a dark blue powder which is insoluble in water, or in dilute acids, but is soluble in concentrated sulfuric acid, the solution being green and is also soluble in dilute carbonate of soda, the solution being bluish violet.

In the same manner corresponding indophenols (which, however, are not soluble in dilute carbonate of soda) can be produced from the esters of the carbazyl-N-acetic acid.

For the production of the dyestuff, the product of condensation may be used as it is, or it may be reduced to the leuco compound.

The manufacture of the dyestuffs may be effected by any suitable method of sulfurizing, for instance it may be effected by heating (with, or without, pressure) the indophenolic compound, or leuco compound thereof, in the presence of a dissolving agent, such for instance, as water, or alcohol, or the like, together with alkaline polysulfid and either with, or without, a metallic salt, such, for instance, as cupric sulfate, or it may be effected by melting the reduced products of condensation with sulfur.

Example of the production of a dyestuff.

64 parts of sulfur and 120 parts of crystallized sodium sulfid are melted together until the sulfur is completely dissolved; 25 parts of water are added and about 25 parts of the indophenol as obtained according to the preceding example, (or of the leuco compound thereof) are stirred in.

The solution is then evaporated until the boiling point of the mass has risen to 115° centigrade at which temperature boiling is continued for about 24 hours with a reflux condenser. The melt is then diluted with water and purified by blowing air through the mass until the whole is oxidized. It is then filtered from the precipitated sulfur and the coloring matter thrown out from the filtrate by the addition of acid. Or the diluted melt can be completely precipitated by the addition of acid and the leuco coloring matter be dissolved out by the addition of soda and filtered from the residue of sulfur, and precipitating by acid or other suitable means.

The coloring matter, and also its leuco body, are characterized by their solubility in sodium carbonate solution, from which solution they can be precipitated by means of an organic, or mineral, acid.

In the dry state the dyestuff is a bluish-black powder having a metallic luster and is insoluble in water and in dilute acids, but is soluble in concentrated sulfuric acid, the solution being a moss-green. It is precipitated from such solution on the addition of water, and is of a bright blue color. It is soluble in dilute carbonate of soda, the color of the solution being greenish blue.

It dyes cotton, from a hydrosulfite vat, or from a sodium sulfid bath, a bright blue.

By melting, according to the same method, the indophenols resulting from the esters of carbazyl-N-acetic acid dyestuffs of similar properties can be obtained.

In the following claims in the expression "para-nitroso-phenol," I include para-nitroso-phenol itself and homologues, and derivatives thereof; in the expression "carbazyl-N-acetic acid" I include also the esters thereof; and in the expression "indophenolic compound" I include also the leuco compound.

What I claim is:—

1. The manufacture of indophenolic compounds by condensing carbazyl-N-acetic acid with para-nitroso-phenol.

2. The manufacture of an indophenolic compound by dissolving para-nitroso-phenol in concentrated sulfuric acid while applying external cooling and, then, while stirring and cooling, adding to this solution carbazyl-N-acetic acid dissolved in cold concentrated sulfuric acid and pouring onto ice, filtering off the product of condensation and washing it.

3. The manufacture of dyestuffs by condensing carbazyl-N-acetic acid with para-nitroso phenol and then heating the resulting indophenolic compound with a sulfurizing agent.

4. The manufacture of dyestuffs by condensing carbazyl-N-acetic acid with para-nitroso phenol and then heating the resulting indophenolic compound with alkaline polysulfid.

5. The manufacture of a dyestuff by melting together sulfur and crystallized sodium sulfid, adding water and stirring in an indophenolic compound, prepared by condensing carbazyl-N-acetic acid with para-nitroso phenol, evaporating, continuing boiling, diluting the melt with water and separating the coloring matter by blowing air through the mass, filtering out the sulfur and precipitating by means of acid.

6. The manufacture of a leuco dyestuff by melting together sulfur and crystallized sodium sulfid, adding water and stirring in an indophenolic compound, evaporating, continuing boiling and diluting the melt with water, precipitating by means of acid and dissolving out the leuco compound by the addition of soda, filtering from sulfur, and precipitating.

7. As new articles of manufacture indophenolic compounds which have been made by condensing carbazyl-N-acetic acid with para-nitroso-phenol.

8. As a new article of manufacture an indophenolic compound which has been made by dissolving para-nitroso-phenol in concentrated sulfuric acid while applying external cooling and, then, while stirring and cooling, adding to this solution carbazyl-N-acetic acid dissolved in cold concentrated sulfuric acid and pouring onto ice, filtering off the product of condensation and washing it.

9. As new articles of manufacture dyestuffs which have been made by condensing carbazyl-N-acetic acid with para-nitroso phenol, and then heating the resulting indophenolic compound with a sulfurizing agent.

10. As new articles of manufacture, dyestuffs which have been made by condensing carbazyl-N-acetic acid with para-nitroso phenol, and then heating the resulting indophenolic compound with alkaline polysulfid.

11. As a new article of manufacture, a dyestuff which has been made by melting together sulfur and crystallized sodium sulfid, adding water and stirring in an indophenolic compound prepared by condensing carbazyl-N-acetic acid with para-nitroso-phenol, evaporating, continuing boiling, diluting the melt with water and separating the coloring matter by blowing air through the mass, filtering out the sulfur and precipitating by means of acid.

12. As a new article of manufacture a leuco dyestuff which has been made by melting together sulfur and crystallized sodium sulfid, adding water and stirring in an indophenolic compound, evaporating, continuing boiling and diluting the melt with water, precipitating by means of acid and dissolving out the leuco compound by the addition of soda, filtering from sulfur, and precipitating.

In testimony whereof I have signed my name to this specification in the presence of two subscribing witnesses.

EDWARD WRAY.

Witnesses:
EWALD SIMPSON MOSELEY,
MARION E. CLOUD.